No. 897,224. PATENTED AUG. 25, 1908.
W. D. NELSON.
CORN HUSKING MACHINE.
APPLICATION FILED APR. 2, 1907.

4 SHEETS—SHEET 4.

Inventor
William D. Nelson,

Witnesses
Wm Koerth
Wm Bagger

By Victor J. Evans
Attorney

UNITED STATES PATENT OFFICE.

WILLIAM D. NELSON, OF MARSEILLES, ILLINOIS.

CORN-HUSKING MACHINE.

No. 897,224.   Specification of Letters Patent.   Patented Aug. 25, 1908.

Application filed April 2, 1907. Serial No. 365,990.

*To all whom it may concern:*

Be it known that I, WILLIAM D. NELSON, a citizen of the United States, residing at Marseilles, in the county of Lasalle and State of Illinois, have invented new and useful Improvements in Corn-Husking Machines, of which the following is a specification.

This invention relates to corn husking machines; and the objects of the invention are to provide a simple, durable, efficient and economical machine for the purpose of stripping the husks from ears of corn.

A further object of the invention is to construct a machine of this class which shall be light in its construction and readily portable so that it may be utilized in the corn field for the purpose of stripping the husks from ears of corn that are broken from the stalks by hand and thrown into the hopper of the machine, thus preventing the injury to and practical destruction of the fodder which results from the use of husking machines that also include means for mechanically stripping the ears from the stalks.

Further objects of the invention are to simplify and improve the construction and operation of this class of machines.

With these and other ends in view which will readily appear as the nature of the invention is better understood, the same consists in the improved construction and novel arrangement and assemblage of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

Figure 1:
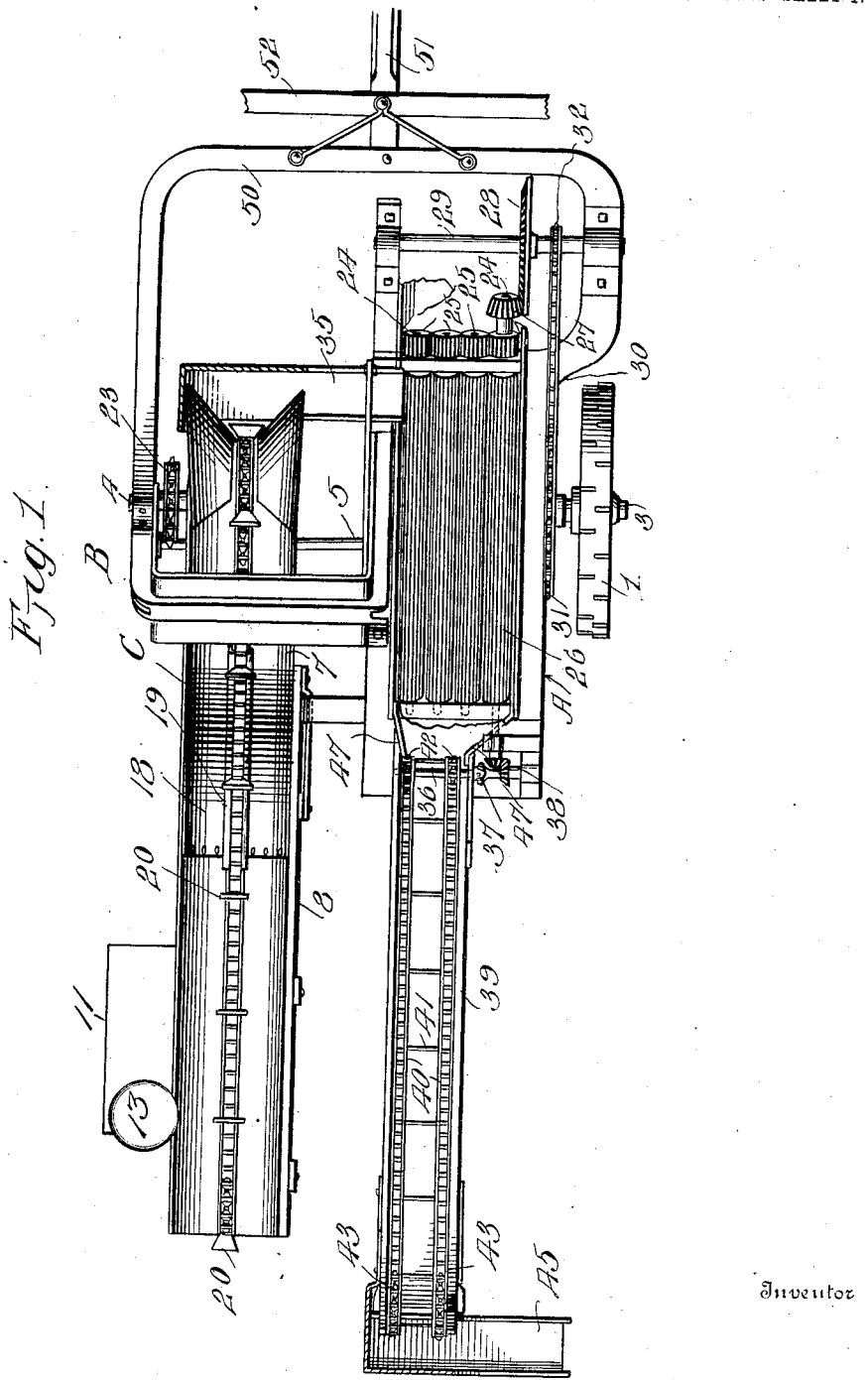
Figure 2:
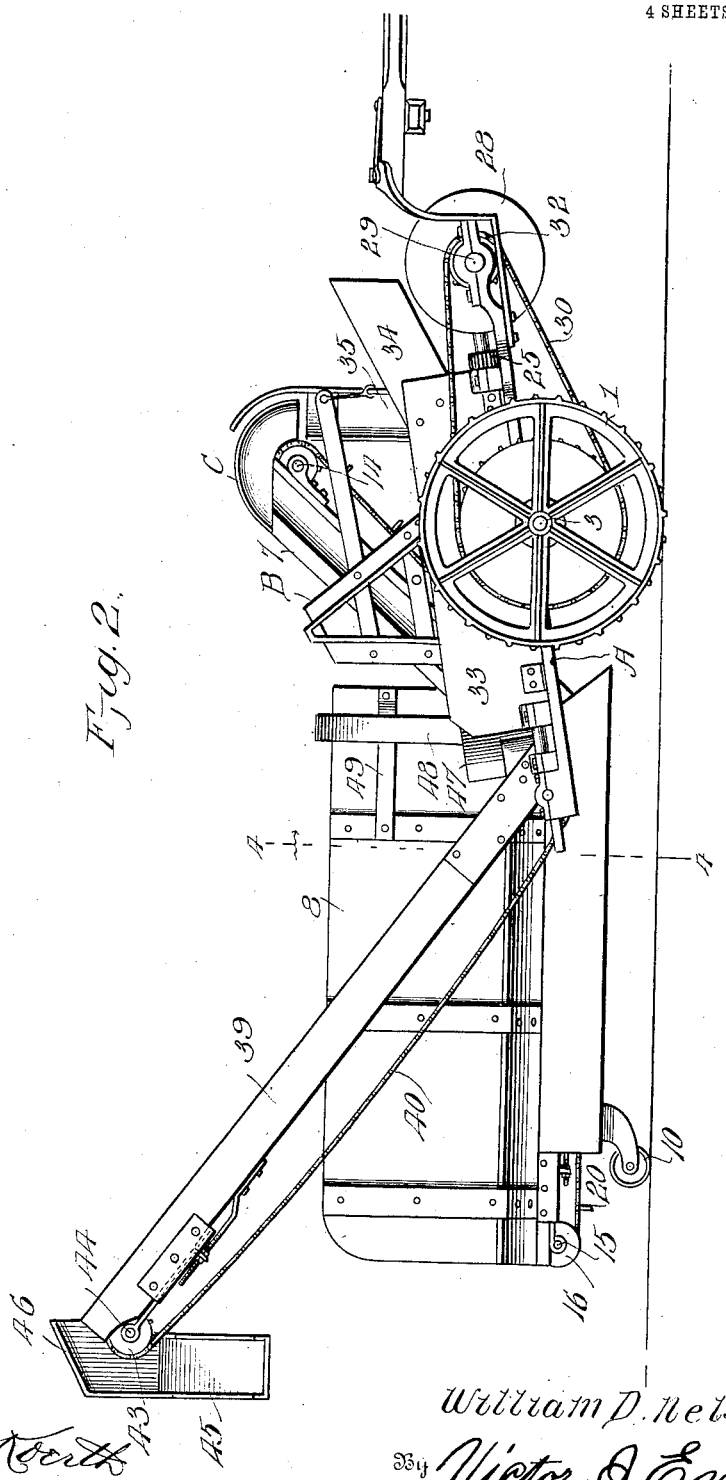
Figure 3:
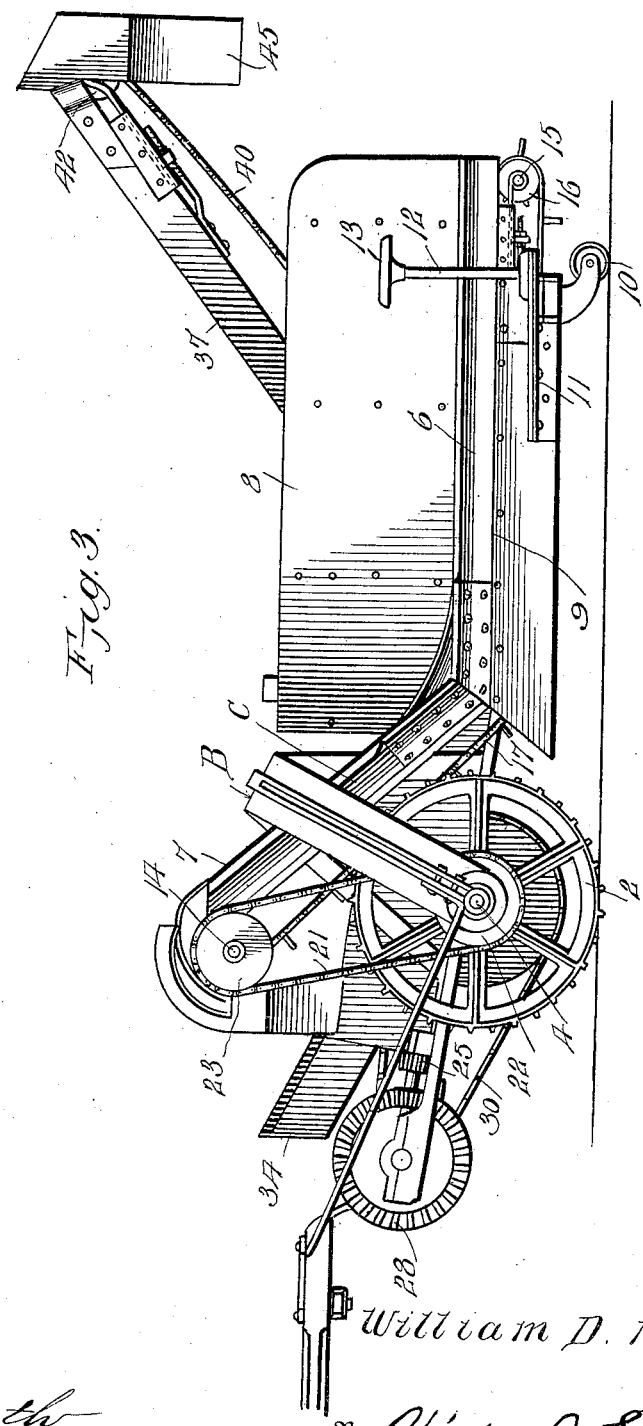
Figure 4:
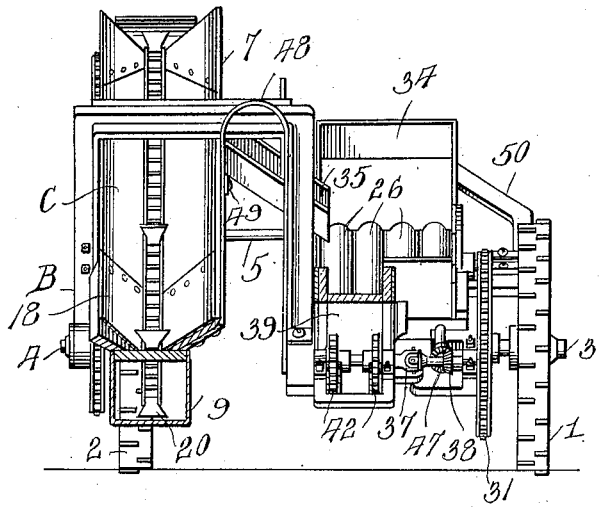

In the drawing, Figure 1 is a top plan view of a corn husking machine embodying the invention; the feed hopper of the husking rolls having been removed, for the purpose of better showing the subjacent parts. Fig. 2 is a side elevation of the same. Fig. 3 is a side elevation of a machine as seen from the opposite side. Fig. 4 is a transverse sectional view taken on the plane indicated by the line 4—4 in Fig. 2.

Corresponding parts in the several figures are denoted by like characters of reference.

The machine includes a main frame A which is disposed or supported in a tilted position, said frame being slightly inclined in a downward and rearward direction; said frame having an arch member B securely connected with one side thereof. Supporting and driving wheels 1 and 2 are connected respectively with the frame A and the arch member B, said wheels being ordinary bull wheels that are mounted upon shafts or axles 3 and 4 with which said bull wheels are preferably adapted to be connected by clutch means of ordinary well known construction, as is usually the case in machines of this character, so that the shafts or axles will be positively driven when the machine moves in a forward direction in order that motion may be transmitted to the working parts thereof while, when the machine is being backed, the wheels will rotate idly upon the shafts or axles. Such clutch mechanism is, however, well known, and its presence is generally understood in machines of this class, and it has therefore been considered unnecessary to illustrate the same.

The arch member B supports a transverse shaft upon which a conveyer C is pivotally mounted. Said conveyer comprises a trough of angular shape; the same comprising a rear portion or hopper 6 which, when the machine is in operation, occupies an approximately horizontal position, and an inclined front portion 7. The hopper or receiving portion of the conveyer C is provided with a guard plate or wall 8 suitably connected with the inner edge thereof; and upon the underside of said hopper is secured an elongated chute 9 for the passage of the endless carrier which operates in the trough or casing of the conveyer, and which is thus protected from injury by contact with stalks and similar obstructions. The rear end of the horizontal portion of the conveyer casing is supported upon a caster 10. A suitable shelf or bracket 11 extending laterally from the chute 9 supports an upright 12 to carry a seat 13 which may be occupied by the driver or operator when the machine is being transported from one place to another.

A shaft 14 is supported for rotation near the upper end of the inclined front portion 7 of the conveyer and another shaft 15 is similarly supported near the rear end of the horizontal portion or hopper 6; said shafts carry sprocket wheels 16 over which is guided an endless chain 17, the upper flight of which is suitably guided in the bottom of the conveyer casing which will be understood as including the hopper 6 and the inclined portion 7. In the said casing at the juncture of the hopper and the inclined portion are disposed suitably curved guide plates 18 having guide flanges 19 for the endless chain which constitutes the carrier; the links of said chain being provided at intervals with plates 20 for the purpose of engaging the ears of corn that are to be conveyed. The lower flight of the endless chain may be guided in any suitable manner over the angular portion of the conveyer trough or casing. The chain 17, constituting the endless carrier, is driven from the shaft or axle 4 by means of a link belt 21 and sprocket wheels 22 and 23 mounted respectively upon the axle 4 and the shaft 14.

The frame A supports a plurality of longitudinally disposed shafts 24 provided at their forward ends with intermeshing pinions 25 and carrying husk stripping rolls 26 of any suitable approved construction. One of the shafts 24 carries a bevel pinion 27 meshing with a bevel gear 28 upon a suitably supported countershaft 29 which is driven from the shaft or axle 3 through the medium of a link belt 30 and sprocket wheels 31 and 32. The frame A is provided at the sides thereof with upstanding flanges 33 between the front ends of which is supported an inclined chute 34 which coöperates with said side flanges to constitute a box or receptacle the bottom of which is formed by the husk stripping rolls, and into which the ear corn is discharged from the upper end of the conveyer seat over a suitably arranged and supported guide chute 35. The rear end of the frame A supports a transverse shaft 36, preferably formed of two sections connected by a knuckle joint 37; said shaft being driven by miter gearing 38 from one of the shafts 24 carrying the husk stripping rolls. Pivotally supported upon the shaft 36 is a suitable conveyer trough or casing 39 wherein operates an endless carrier preferably composed of a pair of endless chains 40 connected by cross pieces or flights 41 and guided over sprocket wheels 42 upon the shaft 36 and over similar sprocket wheels 43 upon a shaft 44 adjustably supported near the upper end of the casing 39 in such a manner that slack in the chains 40 may be taken up at will. A laterally directed discharge chute 45 receives the corn that is discharged over the tail end of the conveyer casing 39, and conducts the same into a proper receptacle, such as the box of a wagon that may be driven alongside of the machine. For the purpose of avoiding wastage, the chute 45 is preferably provided with a hood 46; and for similar reasons the upstanding side flanges 33 upon the frame A are preferably provided with converging end members 47 whereby the husking ears will be guided from the husk stripping rolls to the conveyer trough or casing 39.

Suitably connected with the frame A, near the rear end thereof, is a guide member in the nature of an upstanding hook 48 the free end of which engages between the guard plate or wall 8 connected with the hopper portion 6 of the conveyer C, and a brace or keeper 49 secured thereupon, the object being to prevent lateral movement or undue vibration of the conveyer without interfering with the pivotal movement of the same upon its supporting shaft 5.

The outer side members of the frame A and arch number B respectively are connected with each other by means of forwardly extending frame member 50 to which the draft animals may be attached in the usual manner through the medium of a tongue 51 and evener 52.

From the foregoing description taken in connection with the drawings hereto annexed the operation and advantages of this invention will be readily understood and appreciated by those skilled in the art to which it appertains. This improved machine may be inexpensively constructed of light material so that it may be easily propelled and operated by two horses and under weather conditions, and conditions of the soil that would absolutely preclude the use of a combined corn harvester and husking machine. After stripping the ears from the first row of corn in the field the machine will be driven with the arch member B straddling the row from which the ears have just been stripped; and while the stalks will be bent somewhat by contact with the machine, the fodder will suffer no injury; this is regarded as an important point of advantage over that class of machines which are provided with means for mechanically stripping the ears of corn from the stalks. An operator walking alongside of the machine, adjacent to the hopper 6, breaks the ears of corn from the stalks and throws them into said hopper, the wall or guard plate of which serves to direct the ears into the hopper without danger of their being lost by being thrown too forcibly. From the hopper 6 the ears are conveyed over the inclined portion 7 of the conveyer C and over the chute 35 to the husking stripping rolls which operate in the usual manner to detach the husks which are discharged upon the ground while, owing to the tilted or inclined position in which the frame A is supported, the ears will be discharged over the tail ends of the stripping rolls into the trough or casing 39 where they are elevated by the endless carrier including the chains 40 to the discharge chute 45. Owing to the presence of a knuckle joint 37 in the shaft 36 the endless carrier driven by said shaft will operate successfully under such conditions of vibration as are unavoidable in a machine of this class.

Having thus fully described the invention, what I claim as new is:—

1. In a portable corn husking machine of the class described, an inclined frame, a plurality of suitably driven husk stripping rolls journaled in said frame, an arch connected with the frame, a conveyer casing pivoted in the arch and including an approximately horizontal receiving hopper, an endless carrier in the casing, means for transferring material from the latter to the husk stripping rolls, a guard plate connected with the inner edge of the receiving hopper, a keeper upon said guard plate, and a guide member connected with the frame and having a terminal hook engaging the keeper.

2. In a portable corn husking machine of the class described, an inclined frame, a plurality of husk stripping rolls journaled therein, upstanding flanges upon the frame adjacent to the roll, an inclined chute supported upon the front ends of said flanges, an arch connected with the frame, a conveyer casing pivoted in the arch and including a receiving hopper, rotary supporting means for the latter, a suitably driven endless carrier in the conveyer casing, means for transferring material from the upper end of the latter to the upper ends of the husk stripping rolls, driving means for the latter, a conveyer casing connected pivotally with the tail end of the inclined frame, a suitably driven endless carrier in said casing, and a laterally directed discharge chute connected with the tail end of the latter.

3. A corn husking machine including an arch member, a ground wheel supported at one end of said member, a frame supported by the other end of said member, a ground wheel mounted on the frame, corn husking rolls journaled in the frame, a conveyer pivotally supported in the arch member, a receiving hopper connected with the conveyer, a chute leading from the delivery end of the conveyer to the husking rolls, a guard plate connected with the relatively inner edge of the receiving hopper, and means projecting from the frame to engage the upper end of the guard plate.

4. A corn husking machine comprising an arch member, a ground wheel carried by one of the terminals of the arch member and arranged within the plane of said member, a frame supported by the remaining terminal of the arch member and arranged at an incline to the normal path of travel of the machine, a second ground wheel supported by the frame, a shaft mounted in the arch member above the ground wheel and frame, a conveyer pivotally mounted on the shaft, a receiving hopper secured to the lower end of the conveyer and projecting therefrom in approximately parallel relation to the path of travel of the machine, means for movably supporting the free end of the hopper from the surface over which the machine is traveling, husk stripping rolls journaled in the frame, said rolls being arranged in coincidence with the inclination of the frame, a chute communicating with the upper end of the conveyer and overlying the rolls, and means operated in the travel of the machine for delivering the ears of corn from the husking rolls to a point of deposit.

In testimony whereof, I affix my signature in presence of two witnesses.

WILLIAM D. NELSON.

Witnesses:
ERNEST S. GOODELL,
WALTER J. GOODELL.